United States Patent
Matsukura et al.

(10) Patent No.: US 6,225,382 B1
(45) Date of Patent: May 1, 2001

(54) FLUORINE-CONTAINING RESIN COMPOSITION

(75) Inventors: Ikuo Matsukura; Shunsuke Yokotsuka; Katsumi Suzuki, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/158,771

(22) Filed: Sep. 23, 1998

(30) Foreign Application Priority Data

Sep. 24, 1997 (JP) .................................... 9-258953

(51) Int. Cl.[7] .................. C08K 5/34; C08K 5/45; C08K 5/15; C08K 5/50; C08K 5/57; C08K 5/36
(52) U.S. Cl. .................. 524/100; 524/82; 524/84; 524/111; 524/116; 524/154; 524/178; 524/393; 524/462; 524/463; 524/544
(58) Field of Search ................ 524/544, 462, 524/463, 393, 154, 178, 111, 100, 116, 82, 84; 564/13; 544/216, 219

(56) References Cited

U.S. PATENT DOCUMENTS

| | | | | |
|---|---|---|---|---|
| 3,010,979 | * | 11/1961 | Ramsden | 524/478 |
| 3,322,859 | * | 5/1967 | Sherr et al. | 524/116 |
| 3,415,895 | * | 12/1968 | Stacey et al. | 524/462 |
| 3,474,044 | * | 10/1969 | Goldwhite et al. | 524/116 |
| 4,346,187 | * | 8/1982 | Nichols | 524/83 |
| 4,559,175 | * | 12/1985 | Paciorek et al. | 524/116 |
| 4,594,399 | * | 6/1986 | Anderson et al. | 524/544 |
| 5,009,812 | * | 4/1991 | Finter et al. | 524/404 |
| 5,268,411 | * | 12/1993 | Yokotsuka et al. | 524/462 |
| 5,328,946 | * | 7/1994 | Tuminello et al. | 524/462 |
| 5,356,986 | * | 10/1994 | Stewart et al. | 524/462 |
| 5,498,657 | * | 3/1996 | Sugiyama et al. | 524/462 |
| 5,883,177 | * | 3/1999 | Calaianna et al. | 524/462 |
| 5,969,067 | * | 10/1999 | Brothers et al. | 524/247 |

FOREIGN PATENT DOCUMENTS 0 357 354   3/1990 (EP) .

OTHER PUBLICATIONS

Patent Abstract of Japan, vol. 017, No. 554 (C–1118), Oct. 6, 1993, JP 05 156244, Jun. 22, 1993.

* cited by examiner

Primary Examiner—Veronica P. Hoke
(74) Attorney, Agent, or Firm—Oblon, Spivak, McClelland, Maier & Neustadt, P.C.

(57) ABSTRACT

A fluorine-containing resin composition comprising at least one fluorine-containing polycyclic compound (A) selected from the group consisting of the following compounds (A1), (A2) and (A3), and a polymer (B) having a fluorine-containing alicyclic structure:

(A1) a fluorine-containing non-condensed polycyclic compound having at least two fluorine-containing rings bonded by a bond containing at least one member selected from the group consisting of a triazine ring, an oxygen atom, a sulfur atom, a phosphorus atom and a metal atom, each of said fluorine-containing rings being a carbon ring or a heterocyclic ring, (A2) a fluorine-containing non-condensed polycyclic compound having at least three fluorine-containing rings bonded directly or by a bond containing a carbon atom, each of said fluorine-containing rings being a carbon ring or a heterocyclic ring, (A3) a fluorine-containing condensed polycyclic compound which is a condensed polycyclic compound composed of at least three carbon rings or heterocyclic rings; wherein compound (A1), (A2) or (A3) some or all of hydrogen atoms are substituted by a fluorine atom or a fluorine-containing group.

16 Claims, 2 Drawing Sheets

FLUORINE-CONTAINING RESIN COMPOSITION

The present invention relates to a fluorine-containing resin composition having processability improved without impairing excellent physical properties of a polymer having a fluorine-containing alicyclic structure.

Heretofore, a polymer having fluorine-containing alicyclic structure is used, for example, for a protecting film for electronic parts including semiconductors, for a water-repellent film for ink jet printer heads or for a water and oil proof coat for filters.

This polymer has been used alone, but some attempts have been made to impart new functions by incorporating various additives, modifiers, etc. However, the polymer having a fluorine-containing alicyclic structure has no polar group, whereby solubility of various low molecular weight compounds therein is low, and it frequently occurs that an additive will not be uniformly dissolved or mixed, whereby excellent properties such as electrical properties, mechanical properties, surface properties and transparency, which the polymer originally has, tend to be impaired.

It is an object of the present invention to provide a fluorine-containing resin composition having a new function imparted without impairing excellent properties such as electrical properties, mechanical properties, surface properties and transparency, of the polymer having a fluorine-containing alicyclic structure.

The present invention provides a fluorine-containing resin composition comprising at least one fluorine-containing polycyclic compound (A) selected from the group consisting of the following compounds (A1), (A2) and (A3), and a polymer (B) having a fluorine-containing alicyclic structure:

(A1) a fluorine-containing non-condensed polycyclic compound having at least two fluorine-containing rings bonded by a bond containing at least one member selected from the group consisting of a triazine ring, an oxygen atom, a sulfur atom, a phosphorus atom and a metal atom, each of said fluorine-containing rings being a carbon ring or a heterocyclic ring, of which some or all of hydrogen atoms are substituted by a fluorine atom or a fluorine-containing group;

(A2) a fluorine-containing non-condensed polycyclic compound having at least three fluorine-containing rings bonded directly or by a bond containing a carbon atom, each of said fluorine-containing rings being a carbon ring or a heterocyclic ring, of which some or all of hydrogen atoms are substituted by a fluorine atom or a fluorine-containing group;

(A3) a fluorine-containing condensed polycyclic compound which is a condensed polycyclic compound composed of at least three carbon rings or heterocyclic rings, of which some or all of hydrogen atoms are substituted by a fluorine atom or a fluorine-containing group.

In the present invention, the fluorine-containing polycyclic compound (hereinafter referred to as the compound (A)) may be one member selected from the group consisting of the above compounds (A1), (A2) and (A3) or may be a combination of at least two members selected from the same group.

The compound (A) is preferably a compound having a structure wherein a hydrogen atom in a C-H bond in the compound is substituted by a fluorine atom or a fluorine-containing group, more preferably a compound having a structure wherein all hydrogen atoms in the compound are substituted by fluorine atoms or fluorine-containing groups. Unless the purpose of the present invention is not impaired, part of fluorine atoms in the compound (A) may be substituted by one or two chlorine or bromine atoms. The number average molecular weight of the compound (A) is preferably from $3 \times 10^2$ to $2 \times 10^3$, more preferably from $3 \times 10^2$ to $1 \times 10^3$.

With a view to increasing compatibility with the polymer (B) having a fluorine-containing alicyclic structure (hereinafter referred to as the polymer (B)), the compound (A) contains a fluorine-containing group.

In the present invention, the fluorine-containing ring is a carbon ring or a heterocyclic ring, of which some or all of hydrogen atoms are substituted by a fluorine atom or a fluorine-containing group, and it is a ring other than a condensed ring. The carbon ring and the heterocyclic ring are preferably selected from at least 4-membered rings, and they are more preferably 4- to 6-membered rings. The atoms constituting the heterocyclic ring are preferably selected from a carbon atom, a nitrogen atom, an oxygen atom, a sulfur atom and a phosphorus atom.

The carbon ring may, for example, be a cyclic saturated hydrocarbon ring such as a cyclopentane ring or a cyclohexane ring; an aromatic hydrocarbon ring such as a benzene ring or a ring having one or two hydrogen atoms in a benzene ring substituted by a methyl group; or a cyclic unsaturated hydrocarbon ring other than an aromatic hydrocarbon ring, such as a cyclopentene ring or a cyclohexene ring.

The heterocyclic ring may, for example, be a heterocyclic ring containing one type of a hetero atom, such as a thiophene ring, a furan ring, a pyridine ring, a triazine ring or a triazole ring, or a heterocyclic ring containing two types of hetero atoms such as an isothiazole ring.

A preferred fluorine-containing ring is a fluorine-containing aromatic hydrocarbon ring, and a more preferred fluorine-containing ring is a perfluoroaromatic hydrocarbon ring. As the aromatic hydrocarbon ring, a benzene ring is preferred.

In the present invention, the fluorine-containing non-condensed polycyclic compound is a compound wherein two or more fluorine-containing rings are bonded without co-owning two or more atoms. Here, the term "bonded without co-owning two or more atoms" means that the fluorine-containing rings are bonded with one atom co-owned by them, or the fluorine-containing rings are directly bonded or indirectly bonded. Here, the term "the fluorine-containing rings are indirectly bonded" means that the fluorine-containing rings are bonded via at least one atom.

In a case where two fluorine-containing rings are bonded, such a bond is a bond containing at least one member selected from the group consisting of a triazine ring, oxygen, sulfur, phosphorus and metal. In a case where three or more fluorine-containing rings are bonded, such a bond is a bond containing at least one member selected from the group consisting of a triazine ring, oxygen, sulfur, phosphorus and metal, direct bonding of three or more fluorine-containing rings, or a bond containing carbon.

The metal atom is preferably a bivalent to tetravalent metal atom selected from the group consisting of Zn, Sn, Pb, Ge, Si, Ti, Hg, Cl, As, Se Te and Cd. A more preferred metal is Sn, since it presents a fluorine-containing non-condensed polycyclic compound having good thermal stability and chemical stability.

As a fluorine-containing non-condensed polycyclic compound having at least two fluorine-containing rings bonded by a bond containing a triazine ring, a fluorine-containing aromatic triazine compound of the following formula 1, 2 or 3, is preferred. In this specification, $\Phi^g$ (wherein g is an integer of from 1 to 6) represents a residue having g fluorine atoms removed from perfluorobenzene. In a case where fluorine atoms still remain after removing g fluorine atoms, it may have a structure having some or all of such fluorine atoms substituted by a fluorine-containing group.

The fluorine-containing group in the compound (b) is preferably a $C_{1-20}$ perfluorohydrocarbon group such as a $C_{1-20}$ perfluoroalkyl group.

As a fluorine-containing non-condensed polycyclic compound having at least two fluorine-containing rings bonded by a bond containing a sulfur atom, a fluorine-containing aromatic sulfur-containing compound of the following formula 4 or 5 is preferred.

As a fluorine-containing non-condensed polycyclic compound having at least two fluorine-containing rings bonded by a bond containing a phosphorus atom, a compound represented by $(\Phi^1)_3$-P or a compound having rings bonded by a bond containing a phosphazatriene ring, represented by the following formula 6, is preferred.

As a fluorine-containing non-condensed polycyclic compound having at least two fluorine-containing rings bonded by a bond containing a metal atom, a fluorine-containing aromatic metal-containing compound of the following formula 7 or 8, is preferred.

As a fluorine-containing non-condensed polycyclic compound having at least three fluorine-containing rings bonded directly or by a bond containing carbon, a fluorine-containing aromatic compound of the following formula 9, 10, 11 or 12 is preferred. With a view to not impairing the transparency of the fluorine-containing resin composition, the total number of $\Phi^1$ to $\Phi^4$ is preferably from 3 to 5 in the fluorine-containing aromatic compound of the formula 9, 10, 11 or 12.

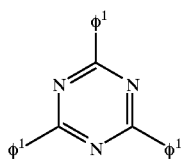

1

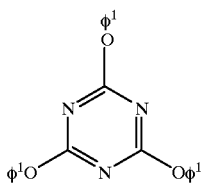

2

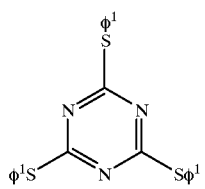

3

F—(—$\Phi^2$—S—)$_h$—$\Phi^1$ (wherein h is an integer of from 1 to 4.)  4

$\Phi^k$ (—S—$\Phi^1$)$_k$ (wherein k is an integer of from 1 to 6.)  5

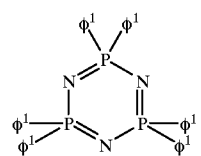

6

$(\Phi^1)_p$—M  7

$(\Phi^1$—)$_q$—M  8

(wherein M is a metal atom selected from the group consisting of Zn, Sn, Pb, Ge, Si, Ti, Hg, Tl, As, Se, Te and Cd, and each of p and q is a valency of metal M and an integer of from 2 to 4.)

F—($\Phi^2$)$_r$—F (wherein r is an integer of from 3 to 7.)  9

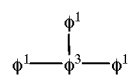

10

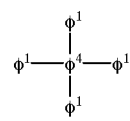

11

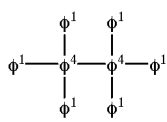

12

In a fluorine-containing condensed polycyclic compound which is a condensed polycyclic compound composed of at least three carbon rings or heterocyclic rings, wherein some or all of hydrogen atoms are substituted by a fluorine atom or a fluorine-containing group, the carbon rings and the heterocyclic rings are preferably at least 4-membered rings, more preferably from 4- to 6-membered rings. Preferred atoms constituting such heterocyclic rings are selected from a carbon atom, a nitrogen atom, an oxygen atom, a sulfur atom and a phosphorus atom.

The fluorine-containing condensed polycyclic compound is preferably a fluorine-containing condensed polycyclic hydrocarbon composed of three or four carbon rings, such as perfluorofluorene, perfluorophenalene, perfluorophenanthrene, perfluoroanthracene, perfluorotriphenylene, perfluoropyrene, perfluorochrysene or perfluoronaphthacene, or a fluorine-containing condensed polycyclic compound of the following formula 13 or 14.

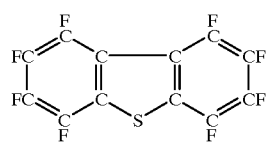

13

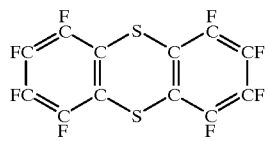

With a view to not impairing the transparency of the fluorine-containing resin composition, a fluorine-containing condensed polycyclic hydrocarbon composed of three carbon rings, such as perfluorofluorene, perfluorophenalene, perfluorophenanthrene or prefluoroanthracene, is more preferred.

The compound (A) is preferably selected from those having an ultraviolet ray absorbing property, thermal stability and high compatibility with the polymer (B) having a fluorine-containing alicyclic structure and those which do not impair the transparency of the fluorine-containing resin composition.

As such a compound (A), particularly preferred is a fluorine-containing non-condensed polycyclic compound having at least two fluorine-containing rings bonded by a bond containing at least a triazine ring. The triazine ring may be a 1,2,3-triazine ring, a 1,2,4-triazine ring or a 1,3,5-triazine ring and is preferably a 1,3,5-triazine ring.

The polymer (B) is preferably one obtained by polymerizing a monomer having a fluorine-containing alicyclic structure, or a polymer having a fluorine-containing alicyclic structure in its main chain, which is obtainable by cyclic polymerization of a fluorine-containing monomer having at least two polymerizable double bonds. Here, the term "having a fluorine-containing alicyclic structure in its main chain" means that the polymer has a structure in which at least one of carbon atoms constituting the alicyclic group is the carbon atom in the carbon chain constituting the main chain, and a fluorine atom or a fluorine-containing group is bonded at least to some of the carbon atoms constituting the alicyclic ring. The fluorine-containing alicyclic structure is preferably a fluorine-containing aliphatic ether ring structure.

The fluorine-containing group in the compound (A) is preferably a $C_{1-20}$ perfluorohydrocarbon group such as a $C_{1-20}$ perfluoroalkyl group.

The number average molecular weight of the polymer (B) is preferably from $1 \times 10^4$ to $5 \times 10^6$, more preferably from $5 \times 10^4$ to $1 \times 10^6$. If the molecular weight is too small, the mechanical properties are likely to be impaired, and if it is too large, the compatibility with the compound (A) is likely to deteriorate, such being undesirable.

The polymer having a fluorine-containing alicyclic structure in its main chain, which is obtainable by polymerizing a monomer having a fluorine-containing alicyclic structure, is well known, for example, from JP-B-63-18964. Namely, a polymer having a fluorine-containing alicyclic structure in its main chain, can be obtained by homopolymerization of a monomer having a fluorine-containing alicyclic structure such as perfluoro(2,2-dimethyl-1,3-dioxole), or copolymerizing such a monomer with a radical-polymerizable monomer such as tetrafluoroethylene, trichlorofluoroethylene or perfluoro(methyl vinyl ether).

Further, a polymer having a fluorine-containing alicyclic structure in its main chain, which is obtainable by cyclic polymerization of a fluorine-containing monomer having at least two polymerizable double bonds, is known, for example, from JP-A-63-238111 or JP-A-63-238115. Namely, a polymer having a fluorine-containing alicyclic structure in its main chain, can be obtained by cyclic polymerization of a monomer such as perfluoro(allyl vinyl ether) or perfluoro(butenyl vinyl ether) or by copolymerizing such a monomer with a radical polymerizable monomer such as tetrafluoroethylene, chlorotrifluoroethylene or perfluoro(methyl vinyl ether).

Further, the polymer having a fluorine-containing alicyclic structure in its main chain, may also be obtained by copolymerizing a monomer having a fluorine-containing alicyclic structure such as perfluoro(2,2-dimethyl-1,3-dioxole) with a fluorine-containing monomer having at least two polymerizable double bonds, such as perfluoro(allyl vinyl ether) or perfluoro(butenyl vinyl ether).

The polymer having a fluorine-containing alicyclic structure is preferably one containing at least 20 mol %, particularly preferably at least 40 mol %, of polymer units having a fluorine-containing alicyclic structure, based on the total polymer units in the polymer having a fluorine-containing alicyclic structure, from the viewpoint of the transparency, mechanical properties, etc.

The polymer having a fluorine-containing alicyclic structure may be those having repeating units represented by any one of the following formulae 15 to 18 as specific examples.

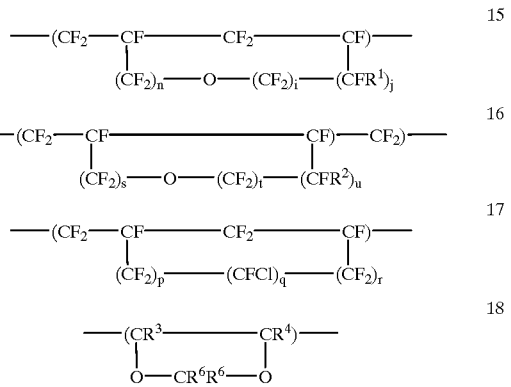

In the formulae 15 to 18, h is an integer of from 0 to 5, i is an integer of from 0 to 4, j is 0 or 1, h+i+j is from 1 to 6, s is an integer of from 0 to 5, t is an integer of from 0 to 4, u is 0 or 1, s+t+u is from 1 to 6, each of p, q and r which are independent of one another, is an integer of from 0 to 5, p+q+r is from 1 to 6, each of $R^1$ to $R^6$ which are independent of one another, is a fluorine atom, a chlorine atom or a trifluoromethyl group.

The monomer having a fluorine-containing alicyclic structure is preferably a monomer selected from the compounds of the following formulae 19 to 21.

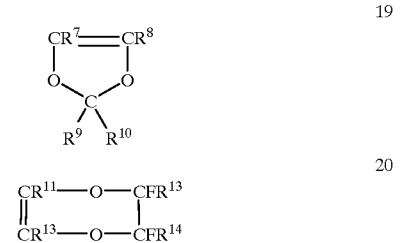

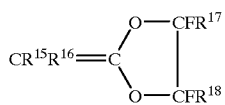
21

In the formulae 19 to 21, each of $R^7$ to $R^{18}$ which are independent of one another, is a fluorine atom, a chlorine atom or a trifluoromethyl group, or each pair of $R^9$ and $R^{10}$, $R^{13}$ and $R^{14}$, and $R^{17}$ and $R^{18}$, may together form a bivalent group selected from the group consisting of —$(CF_2)_4$—, —$(CF_2)_3$—, —$(CF_2)_2$—, —$CF_2$—O—$CF_2$—, —$(CF_2)_2$—O—$CF_2$—, —O—$(CF_2)_2$— and —O—$(CF_2)_3$—.

Specific examples of the compounds of the formulae 19 to 21 include compounds of the following formulae 22 to 29:

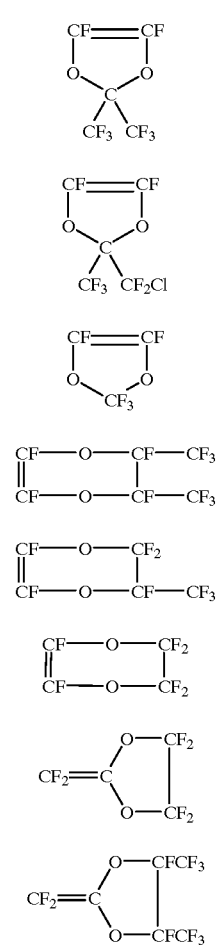

As the fluorine-containing monomer having at least two polymerizable double bonds, compounds of the following formulae 30 to 32, are preferred.

$$CY^1Y^2\!=\!CY^3OCY^4Y^5CY^6Y^7CY^8\!=\!CY^9Y^{10} \quad 30$$

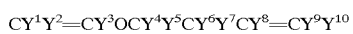

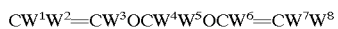

In the formulae 30 to 32, each of $Y^1$ to $Y^{10}$, $Z^1$ to $Z^8$ and $W^1$ to $W^8$, which are independent of one another, is a fluorine atom, a chlorine atom or a trifluoromethyl group.

Specific examples of the compounds of the formulae 30 to 32, include the following compounds:

$CF_2\!=\!CFOCF_2CF_2CF\!=\!CF_2$ $CF_2\!=\!CFOCFl_2CF_2CF\!=\!CF_2$ $CF_2\!=\!CFOCF_2CF_2CCl\!=\!CF_2$ $CF_2\!=\!CFOCF_2CFClCF\!=\!CF_2$ $CF_2\!=\!CFOCF_2CF_2CF\!=\!CFCl$ $CF_2\!=\!CFOCF_2CF(CF_3)CF\!=\!CF_2$ $CF_2\!=\!CFOCF_2CF(CF_3)CCl\!=\!CF_2$ $CF_2\!=\!CFOCF_2CF\!=\!CF_2$ $CF_2\!=\!CFOCF(CF_3)CF\!=\!CF_2$ $CF_2\!=\!CFOC(CF_3)_2CF\!=\!CF_2$ $CF_2\!=\!CFOCF_2OCF\!=\!CF_2$ $CF_2\!=\!CClOCF_2OCCl\!=\!CF_2$ $CF_3\!=\!CFOCCl_2OCF\!=\!CF_2$ $CF_3\!=\!CFOC(CF_3)_2OCF\!=\!CF_3$

The compound (A) in the present invention has good solubility in the polymer (B), and its saturated solubility is from 5 to 20 wt %. With respect to the solubility parameter (SP value) as an index for the solubility, the compound (b) has a solubility parameter of from 8 to 10 $(cal/cm^3)^{1/2}$ which is close to the solubility parameter of from 6 to 7 $(cal/cm^3)^{1/2}$ of the polymer (a). This is believed to be attributable to the excellent solubility.

In a case where the content of the compound (b) in the polymer (B) is lower than the above saturated solubility, the transparency of the fluorine-containing resin composition of the present invention will be excellent, and there will be little light scattering caused by microscopic phase separation or by crystallites of the compound (A). Accordingly, for example, the visible light (wavelength: 400 to 700 nm) transmittance of a film having a thickness of from 100 μm to 10 μm will be at least 90%.

The fluorine-containing resin composition of the present invention absorbs ultraviolet rays having wavelengths of at most 300 nm. Accordingly, it is used not only for various ultraviolet ray shielding films, but also for forming micropatterns utilizing laser abrasion by an excimer laser such as KrF or ArF. As an application example of micropatterns, formation of a protective film or an interlayer insulation film for a semiconductor in the process for producing semiconductor elements, may be mentioned. Further, it may be used for forming an ink discharge outlet in the form of a water repellent film for a head of an ink jet printer.

The proportion of the compound (A) to the polymer (B) may be varied depending upon the particular application of the fluorine-containing resin composition of the present invention. However, the proportion of the compound (A) is usually from 0.01 to 50 parts by weight per 100 parts by weight of the polymer (B).

In order to maintain the transparency of the fluorine-containing resin composition, the proportion of the compound (A) is preferably from 0.01 to 20 parts by weight per 100 parts by weight of the polymer (B). In a case where the fluorine-containing resin composition is used for the purpose of absorbing ultraviolet rays, the proportion of the compound (A) is preferably from 0.01 to 10 parts by weight per 100 parts by weight of the polymer (B).

As a method for preparing the fluorine-containing resin composition of the present invention, there may, for example, be employed a method wherein the polymer (B) and the compound (A) are charged in a closed container and heated to the melting temperature of the polymer (B) to dissolve and disperse them to obtain a uniform composition, or a method wherein, using a common solvent to dissolve the two materials, they are uniformly mixed in a solution state.

The solvent may, for example, be a polyfluoroaromatic hydrocarbon compound such as perfluorobenzene or bis(trifluoromethyl)benzene, a polyfluorotrialkylamine compound such as perfluorotributylamine or perfluorotripropylamine, a polyfluoroalkane compound such as perfluorohexane, perfluorooctane, (perfluoro-n-octyl)ethane or perfluoro(2,3,5-trimethylhexane), a polyfluoroolefin compound such as (perfluoro-n-octyl)ethylene, a polyfluorocycloalkane compound such as perfluorocyclohexane or perfluorodecalin, a polyfluorocyclic ether compound such as perfluoro(2-butyltetrahydrofuran), a hydrochlorofluorocarbon such as 1,3-dichloro-1,1,2,2,3-pentafluoropropane or 3,3-dichloro-1,1,1,2,2-pentafluoropropane, or a fluorine-containing low molecular weight polyether. These solvents may be used alone or in combination as a mixture.

Now, the present invention will be described in further detail with reference to Examples. Examples 1 and 2 are Examples for preparing the polymer (a), Examples 3 to 8 are Working Examples of the present invention, and Example 9 is a Reference Example. In these Example, "parts" means "parts by weight".

EXAMPLE 1

750 g of perfluoro(butenyl vinyl ether), 4 kg of deionized water, 260 g of methanol and 3.7 g of $((CH_2)_2 CHCOO)_2$ were put into a flask having an internal capacity of 5 lit. After substituting the interior of the system by nitrogen, suspension polymerization was carried out at 40° C. for 22 hours. As a result, 690 g of a polymer having a number average molecular weight of about $5\times10^4$ (hereinafter referred to as polymer A) was obtained.

The intrinsic viscosity [η] of polymer A was 0.3 at 30° C. in perfluoro(2-butyltetrahydrofuran) [PBTHF]. The glass transition point of polymer A was 108° C., and it was a transparent glass-like polymer which was tough at room temperature. Further, it had a refractive index of 1.342 and a SP value of 6.6 $(cal/cm^3)^{1/2}$.

EXAMPLE 2

Perfluoro(2,2-diemthyl-1,3-dioxole) and tetrafluoroethylene were subjected to radical polymerization in a weight ratio of 80:20 using PBTHF as the solvent, to obtain a polymer having a glass transition point of 160° C. and a number average molecular weight of about $1.7\times10^5$ (hereinafter referred to as polymer B). Polymer B was colorless and transparent and had a refractive index of 1.305 and a SP value of 6.3 $(cal/cm^3)^{1/2}$.

EXAMPLE 3

9 Parts of polymer A and 1 part of tetra(perfluorophenyl) tin were dissolved in PBTHF to obtain a fluorine-containing resin composition which was a solution having a solid content concentration of 12 wt %. This solution was cast on a glass plate and dried at 180° C. to obtain a film having a thickness of 10 μm. The light transmittance of this film was measured and found to be at least 90% for visible light rays of from 350 to 700 nm. Thus, this fluorine-containing resin composition was found to be a uniform composition free from light scattering attributable to phase separation.

Figure 1:
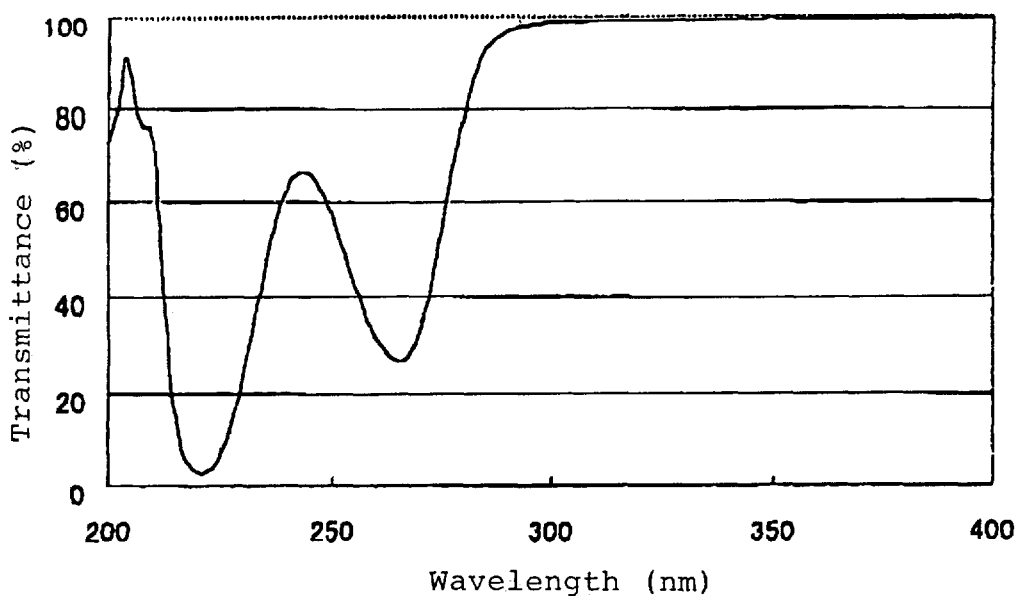
FIG. 1 is a graph showing the transmittances of light rays (wavelength: 200 to 400 nm) through the film of Example 3.

The content of perfluorotetraphenyl tin in this film was 6.7 wt %, and the refractive index of this film was 1.357. Further, as shown in FIG. 1, this film was found to have excellent ultraviolet ray absorbing properties as it shows absorption for lights in the wavelength range of ultraviolet rays with the absorption peaks being at 220 nm and 265 nm.

EXAMPLE 4

9 Parts of polymer A and 1 part of perfluorotriphenylphosphine were dissolved in PBTHF to obtain a fluorine-containing resin composition which was a solution having a solid content concentration of 12 wt %. This solution was cast on a glass plate and dried to obtain a film having a thickness of 10 μm. The light transmittance of this film was measured and found to be at least 90% for visible light rays of from 350 to 700 nm. Thus, this fluorine-containing resin composition was found to be a uniform composition free from light scattering attributable to phase separation.

Figure 2:
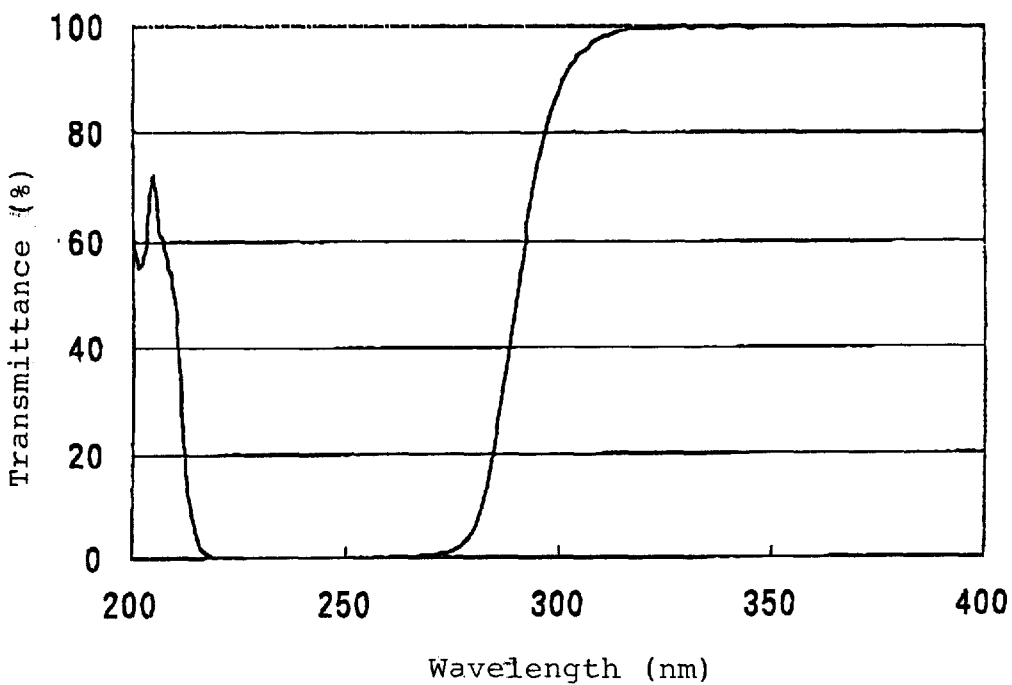
FIG. 2 is a graph showing the transmittances of light rays (wavelength: 200 to 400 nm) through the film of Example 4.

The content of perfluorotriphenylphosphine in this film was 9.6 wt %, and the refractive index of this film was 1.366. Further, as shown in FIG. 2, this film was found to have excellent ultraviolet ray absorbing properties, as it shows absorption of lights in the wavelength range of from 210 nm to 280 nm.

EXAMPLE 5

9 Parts of polymer A and 1 part of 1,4-bis(perfluorophenylthio)tetrafluorobenzene were dissolved in PBTHF to obtain a fluorine-containing resin composition which was a solution having a solid content concentration of 12 wt %. This solution was cast on a glass plate and dried to obtain a film having a thickness of 10 μm. The light transmittance of this film was measured and found to be at least 90% for visible light rays of from 350 to 700 nm. Thus, this fluorine-containing resin composition was found to be a uniform composition free from light scattering attributable to phase separation.

Figure 3:
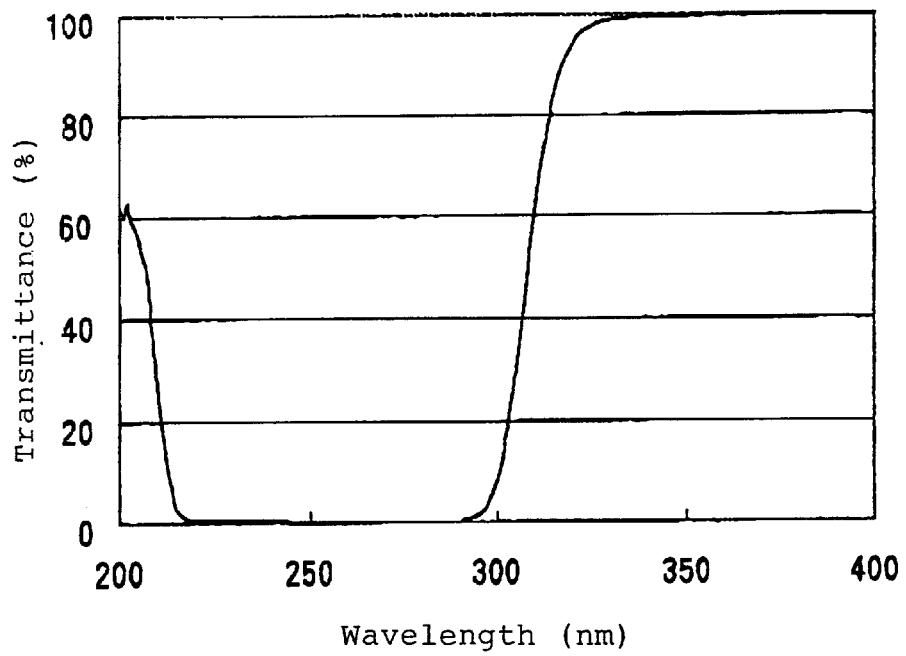
FIG. 3 is a graph showing the transmittances of light rays (wavelength: 200 to 400 nm) through the film of Example 5.

The content of 1,4-bis(perfluorophenylthio) tetrafluorobenzene in this film was 5.7 wt %, and the refractive index of this film was 1.357. Further, as shown in FIG. 3, this film was found to have excellent ultraviolet ray absorbing properties, as it shows absorption of lights in the wavelength range of from 210 nm to 300 nm.

EXAMPLE 6

9 Parts of polymer A and 1 part of tris(perfluorophenyl)-1,3,5-triazine were dissolved in PBTHF to obtain a fluorine-containing resin composition which was a solution having a solid content concentration of 12 wt %. This solution was cast on a glass plate and dried to obtain a film having a thickness of 10 μm. The light transmittance of this film was measured and found to be at least 90% for visible light rays of from 350 to 700 nm. Thus, this fluorine-containing resin composition was found to be a uniform composition free from light scattering attributable to phase separation.

Figure 4:
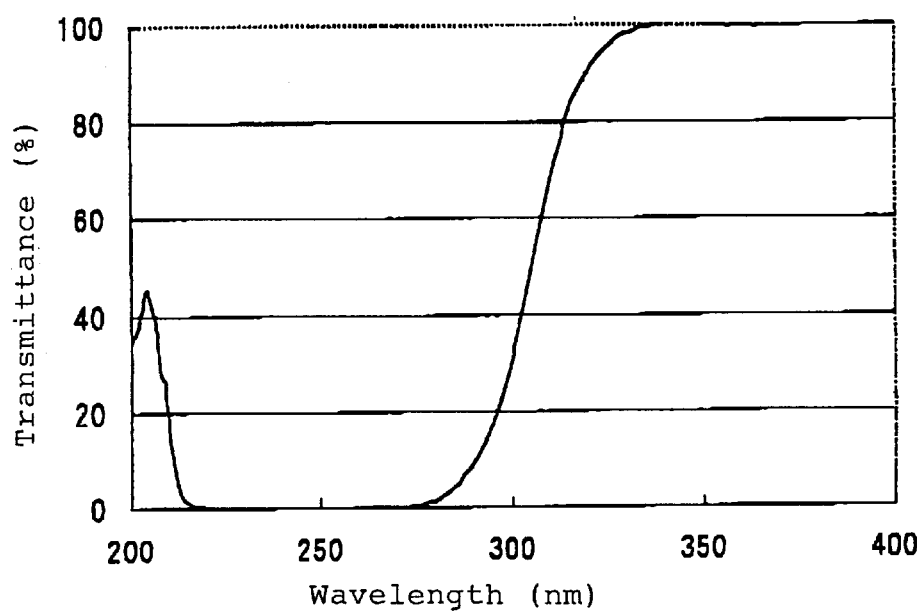
FIG. 4 is a graph showing the transmittances of light rays (wavelength: 200 to 400 nm) through the film of Example 6.

The content of tris(perfluorophenyl)-1,3,5-triazine in this film was 6.0 wt %, and the refractive index of this film was 1.358. Further, as shown in FIG. 4, this film was found to have excellent ultraviolet ray absorbing properties, as it shows absorption of lights in the wavelength range of from 210 nm to 300 nm.

EXAMPLE 7

9 Parts of polymer A and 1 part of perfluoro(p-terphenyl) were dissolved in PBTHF to obtain a fluorine-containing resin composition which was a solution having a solid content concentration of 12 wt %. This solution was cast on a glass plate and dried to obtain a film having a thickness of 10 μm. The light transmittance of this film was measured and found to be at least 90% for visible light rays of from 350 to 700 nm. Thus, this fluorine-containing resin composition was found to be a uniform composition free from light scattering attributable to phase separation.

The content of perfluoro(p-terphenylene) in this film was 6.9 wt %, and the refractive index of this film was 1.357. Further, this film was found to have excellent ultraviolet ray absorbing properties, as it shows absorption of lights in the wavelength range of from 210 nm to 280 nm.

EXAMPLE 8

9 Parts of polymer B and 1 part of tris(perfluorophenyl) 1,3,5-triazine were dissolved in PBTHF to obtain a fluorine-containing resin composition which was a solution having a solid content concentration of 12 wt %. This solution was cast on a glass plate and dried to obtain a film having a thickness of 10 μm. The light transmittance of this film was measured and found to be at least 90% for visible light rays of from 350 to 700 nm. Thus, this fluorine-containing resin composition was a uniform composition free from light scattering attributable to phase separation.

The content of tris(perfluorophenyl)1,3,5-triazine in this film was 6.2 wt %, and the refractive index of this film was 1.347. Further, this film was found to have excellent ultraviolet ray absorbing properties, as it shows absorption of lights in the wavelength range of from 210 nm to 320 nm.

EXAMPLE 9

Using the solution prepared in Example 8, a thin film having a thickness of 3 μm was formed on a silicon wafer by spin coating. Then, through a mask, exposure was carried out by an excimer laser of 248 nm, whereby it was possible to carry out patterning with an exposure of 0.8 J/cm$^3$.

In the fluorine-containing resin composition of the present invention, the fluorine-containing polycyclic compound is uniformly dissolved without turbidity in the polymer having a fluorine-containing alicyclic structure, and the composition is useful not only for ultraviolet ray shielding films but also for forming a protective film or an interlayer insulation film for a semiconductor in the process for producing semiconductor elements, or for forming an ink discharge outlet in the form of a water repellent film for a head of an ink jet printer.

What is claimed is:

1. A fluorine-containing resin composition comprising at least one fluorine-containing polycyclic compound (A) selected from the group consisting of the following compounds (A1), (A2) and (A3), and a polymer (B) having a fluorine-containing alicyclic structure:

(A1) a fluorine-containing non-condensed polycyclic compound having at least three fluorine-containing aromatic hydrocarbon rings bonded by a bond containing at least one member selected from the group consisting of a triazine ring, an oxygen atom, a sulfur atom, a phosphorus atom and a metal atom, each of said fluorine-containing aromatic hydrocarbon rings of which all of hydrogen atoms are substituted by a fluorine atom or a fluorine-containing group;

(A2) a fluorine-containing non-condensed polycyclic compound having at least three fluorine-containing aromatic hydrocarbon rings bonded directly or by a bond containing a carbon atom, each of said fluorine-containing aromatic hydrocarbon rings of which all of hydrogen atoms are substituted by a fluorine atom or a fluorine-containing group;

(A3) a fluorine-containing condensed polycyclic compound which is a condensed polycyclic compound composed of at least three carbon rings or heterocyclic rings, of which all of hydrogen atoms are substituted by a fluorine atom or a fluorine-containing group, wherein the fluorine-containing polycyclic compound (A) is used in an amount of from 0.01 to 40 parts by weight, per 100 parts by weight of the polymer having a fluorine-containing alicyclic structure (B).

2. The fluorine-containing resin composition according to claim 1, wherein the fluorine-containing polycyclic compound has a solubility parameter of from 8 to 10 (cal/cm$^3$)$^{1/2}$, and the polymer having a fluorine-containing alicyclic structure has a solubility parameter of from 6 to 7 (cal/cm$^3$)$^{1/2}$.

3. The fluorine-containing resin composition according to claim 1, wherein the polymer having a fluorine-containing alicyclic structure has a number average molecular weight of from $1 \times 10^4$ to $5 \times 10^6$.

4. The fluorine-containing resin composition according to claim 1, wherein the fluorine-containing polycyclic compound has a number average molecular weight of from $3 \times 10^2$ to $2 \times 10^3$.

5. The fluorine-containing resin composition according to claim 1, wherein said carbon rings are an at least 4-membered ring.

6. The fluorine-containing resin composition according to claim 1, wherein said carbon rings are a cyclic saturated hydrocarbon ring or a cyclic unsaturated hydrocarbon ring.

7. The fluorine-containing resin composition according to claim 6, wherein the cyclic saturated hydrocarbon ring is a cyclopentane ring or a cyclohexane ring.

8. The fluorine-containing resin composition according to claim 6, wherein the cyclic unsaturated hydrocarbon ring is a cyclopentene ring, a cyclohexene ring or a benzene ring.

9. The fluorine-containing resin composition according to claim 1, wherein said heterocyclic rings are an at least 4-membered ring.

10. The fluorine-containing resin composition according to claim 1, wherein the atoms constituting said heterocyclic rings are selected from a carbon atom, a nitrogen atom, an oxygen atom, a sulfur atom and a phosphorus atom.

11. The fluorine-containing resin composition according to claim 1, wherein said heterocyclic rings are a heterocyclic ring containing one or two types of hetero atoms.

12. The fluorine-containing resin composition according to claim 11, wherein the heterocyclic ring containing one type of a hetero atom is a thiophene ring, a furan ring, a pyridine ring, a triazine ring or a triazole ring.

13. The fluorine-containing resin composition according to claim 11, wherein the heterocyclic ring containing two types of hetero atoms is an isothiazole ring.

14. The fluorine-containing resin composition according to claim 1, wherein said fluorine-containing group is a $C_{1-20}$ perfluorohydrocarbon group.

15. The fluorine-containing resin composition according to claim 1, wherein said metal atom is a trivalent or tetravalent metal selected from the group consisting of Zn, Sn, Pb, Ge, Si, Ti, Hg, Tl, As, Se, Te and Cd.

16. The fluorine-containing resin composition according to claim 1, wherein said fluorine-containing non-condensed polycyclic compound is a compound having at least three fluorine-containing aromatic hydrocarbon rings bonded by a bond containing at least a triazine ring.

* * * * *